Dec. 6, 1966  E. H. WILLETTS  3,290,053
EQUALIZING VEHICLE SUSPENSION STRUCTURE
Filed June 17, 1965  4 Sheets-Sheet 2

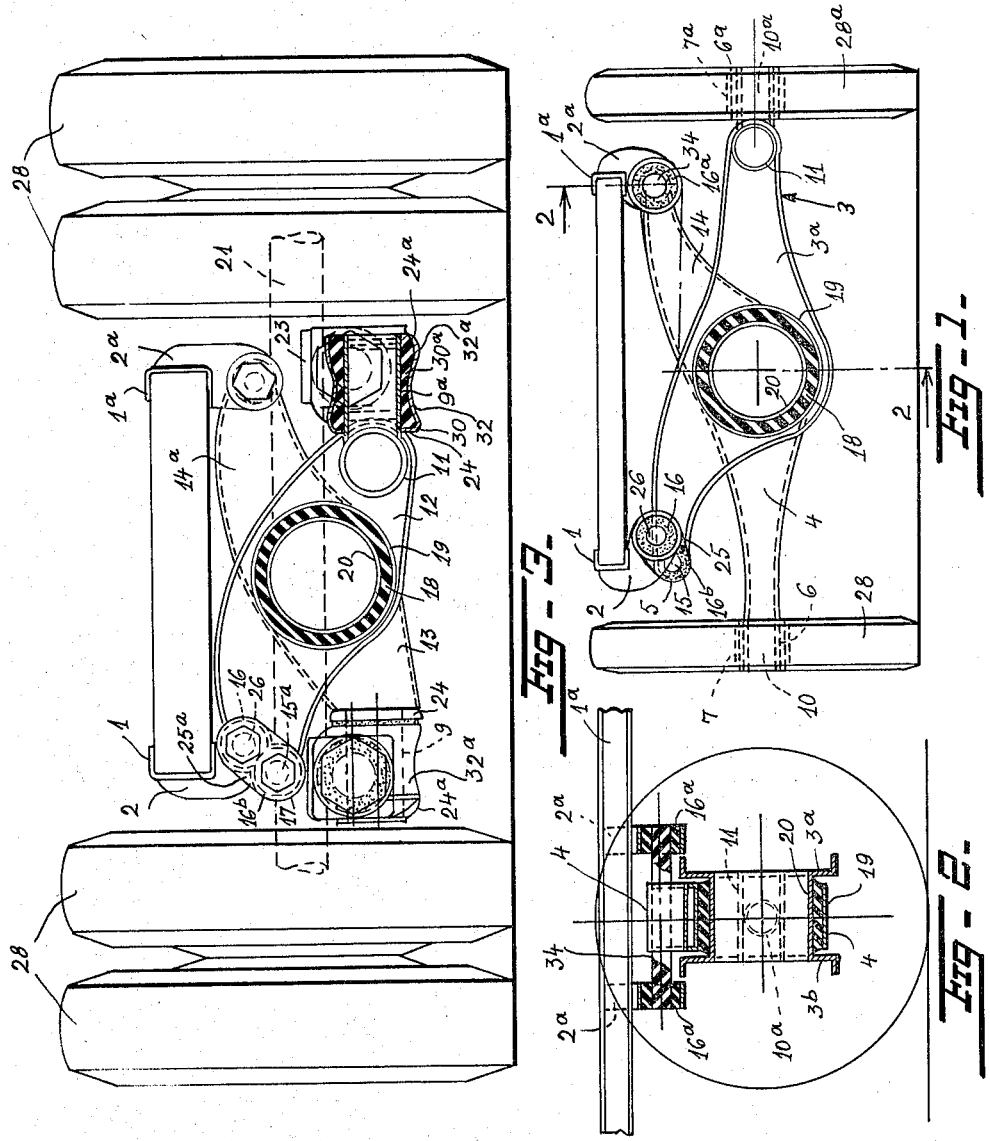

INVENTOR
Elwood H. Willetts
BY Polachek & Saulsbury
ATTORNEYS.

Dec. 6, 1966  E. H. WILLETTS  3,290,053
EQUALIZING VEHICLE SUSPENSION STRUCTURE
Filed June 17, 1965  4 Sheets-Sheet 3
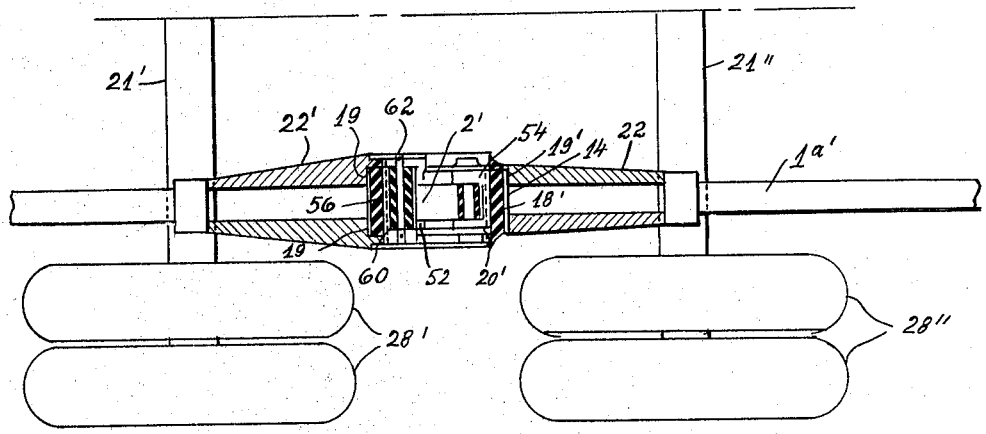
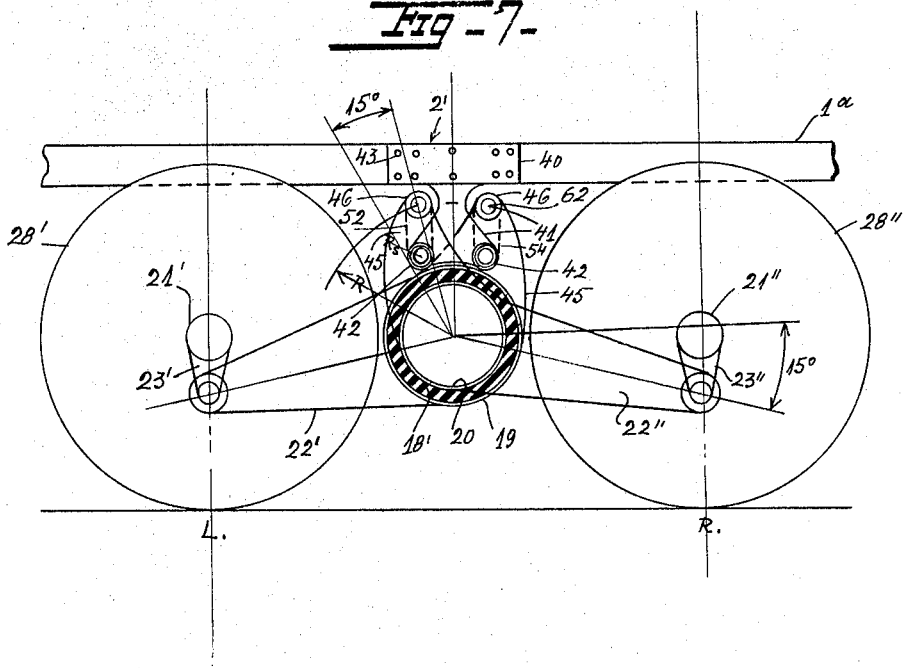
INVENTOR
Elwood H. Willetts
BY Polachek & Saulsbury
ATTORNEYS.

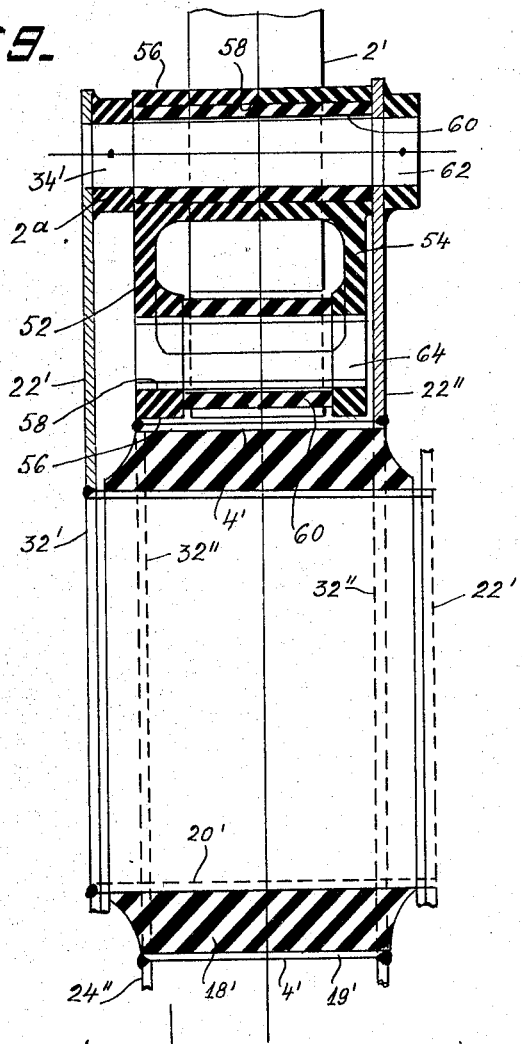
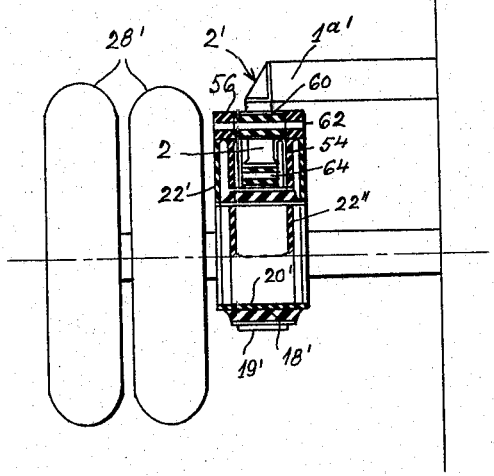

United States Patent Office 3,290,053
Patented Dec. 6, 1966

3,290,053
EQUALIZING VEHICLE SUSPENSION STRUCTURE
Elwood H. Willetts, 320 Kenmore Road, Douglaston, Long Island, N.Y.
Filed June 17, 1965, Ser. No. 464,815
5 Claims. (Cl. 280—104.5)

This invention relates to a vehicle suspension capable of providing an infinitely greater sensitivity to vertical dynamic forces, without accompanying static transverse roll, while dependent on a torque reactive elastomer bushing having a lower ratio of static to dynamic resistance than with materials used heretofore, and this application is a continuation-in-part of my copending application, Serial Number 256,683, filed February 6, 1963.

In this invention, the load is vertically cushioned by a single longitudinally-extending torque-reactive elastomer bushing bondedly interconnected at its inner and outer diameters to a pair of opposing crossed levers at their respective hinge centers, the upper end of each lever being connected to a vehicle frame and the lower end of each said crossed lever being connected either directly or indirectly to a supporting wheel spindle, a supporting cross axle, or to the several axles of a bogie, whereby load deflection on opposite sides of the vehicle are uniformly resisted by opposing torsional strains on the respective inner and outer diameters of the torque reactive elastomer bushing.

The principal object of this invention is to prevent transverse roll in a vehicle with a low frequency suspension using a tubular elastomer stressed in torsional shear.

Another object of this invention is to provide a vehicle suspension affording low resistance to vertical dynamic forces and high resistance to transverse static forces, comprising a torque reactive elastomer bushing stressed in torsional shear and bonded to a pair of frame connected crossed levers extending either directly or indirectly to the spindles of supporting wheels.

It is another object of this invention to provide a low cost light-weight multiple axle bogie suspension disposed between longitudinally-spaced driving axles interconnected by a propeller shaft, affording maximum freedom of wheel vertical movement and a soft ride.

It is another object of the invention to provide a bogie suspension structure such that when applied at 90° to its use with a single axle, to be applicable to tandem axle suspension with relatively low resistance to dynamic shock forces.

For other objects of this invention, and for a better understanding of the invention, reference may be had to the following detailed description taken in connection with the accompanying drawings, in which FIGURE 1 is a fragmentary end elevational view of one form of the invention showing wheels journalled on spindles integral with the lower ends of crossed levers, with the upper ends of the levers hinged to the frame, one hinge having a shackle connection with the frame, and with the tubular shaft of the lever which extends from lower left to upper right surrounding a tubular elastomer bushing, which, in turn, surrounds the shaft connecting the divided parts of the opposing lever which extends from lower right to a shackle on the frame at upper left.

FIG. 2 is a fragmentary vertical sectional view taken generally at the transverse center of the structure on line 2—2 of FIG. 1, showing the torsionally stressed elastomer bushing bondedly interconnecting the inner shaft of the divided outside lever and the surrounding tubular shaft of the inside lever, with the divided parts of the outside lever joined (beyond interference with the inside lever) by a connecting tube to which the wheel spindle is welded, and with the hinge bushings connecting the inside lever to the frame.

FIG. 3 is a fragmentary sectional view of another form of the invention showing an offset relationship between the end connections of the suspension beams to the axles, and the inward lower center of the crossed lever connection to said suspension beams midway between axles, thereby providing shackle means at the lower ends of said crossed levers; and showing shackle means at the frame connection end of one of the opposing torsionally restrained load bearing crossed levers.

FIG. 6 is a fragmentary transverse sectional and top plan view similar to FIG. 4 of another modified form of the invention.

FIG. 7 is a fragmentary vertical sectional and side elevational view similar to FIG. 5 of the form of the invention shown in FIG. 6.

FIG. 8 is a fragmentary part end elevational and part sectional view similar to FIG. 3 of the modified form of the invention shown in FIG. 6.

FIG. 9 is an enlarged fragmentary vertical sectional view of the form of invention shown in FIG. 6.

Figure 4:
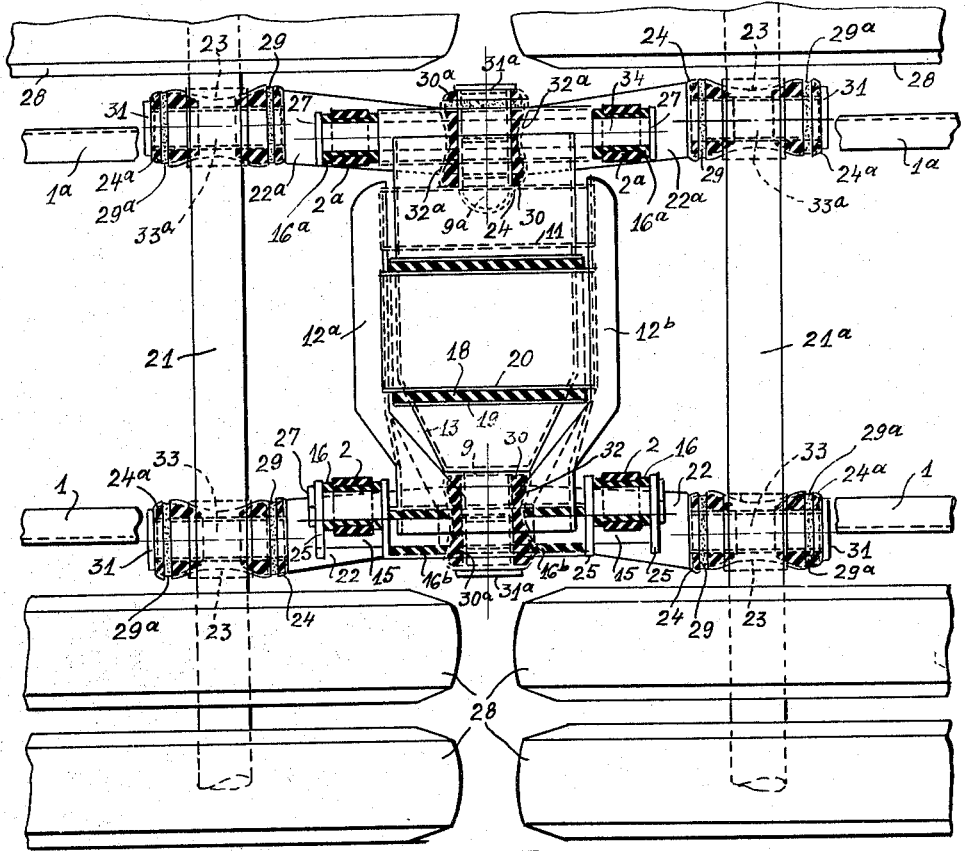
FIG. 4 is a fragmentary transverse sectional and top plan view of the form of the invention shown in FIG. 3, the portions being broken away to show the relation of the torsionally stressed tubular hinge bushing of the crossed levers to the resiliently bushed connections at the frame, the suspension beams and the axles.

Referring now particularly to FIGS. 1 and 2, the crossed levers 3, 4 are hingedly connected to a torque reactive elastomer bushing 18, which is bonded to the outer diameter of shaft 20, and to the inner diameter of a concentric hollow shaft 19. Said shaft 20 securely joins the divided parts 3a, 3b of crossed lever 3, while outer hollow shaft 19 is secured to the inside lever 4.

As the frame ends of levers 3, 4 are depressed by load at frame brackets 2, 2a the torsionally stressed elastomer bushing 18 is torsionally strained in opposite directions between shaft 20, and hollow shaft 19, to resist said deflection uniformly (as between the opposite side frame sides 1, 1a).

Below its hinge center on the torsionally stressed bushing 18, the crossed lever 4 extends oppositely from its frame bracket 2a, and terminates in an integral wheel spindle 10, with wheel bearing 6, and hub 7 of wheel 28.

The divided lever parts 3a, 3b are joined below the point of interference with inside lever 4, by the connecting tube 11, to which wheel spindle 10a is welded. A wheel 28a is journalled by its hub 7a and bushing 6a to the spindle 10a.

The upper end 14 of crossed lever 4 is provided with a hinge pin 34 extending longitudinally beyond the sides of lever 4 and mounted in resilient rubber bushings 16a in frame brackets 2a.

The upper end of divided lever 3 is provided with a shackle 5 which comprises shackle pin 26 carried in spaced bushings 16 with shackle links 25 connected to hinge pin 15 mounted in bushings 16b within the upper end of lever 3, thus enabling arcuate movement of the upper end of said lever 3 about the common hinge center of the elastomer bushing 18.

Any suitable form of structure for providing attachment of the suspension may be provided.

Figure 5:
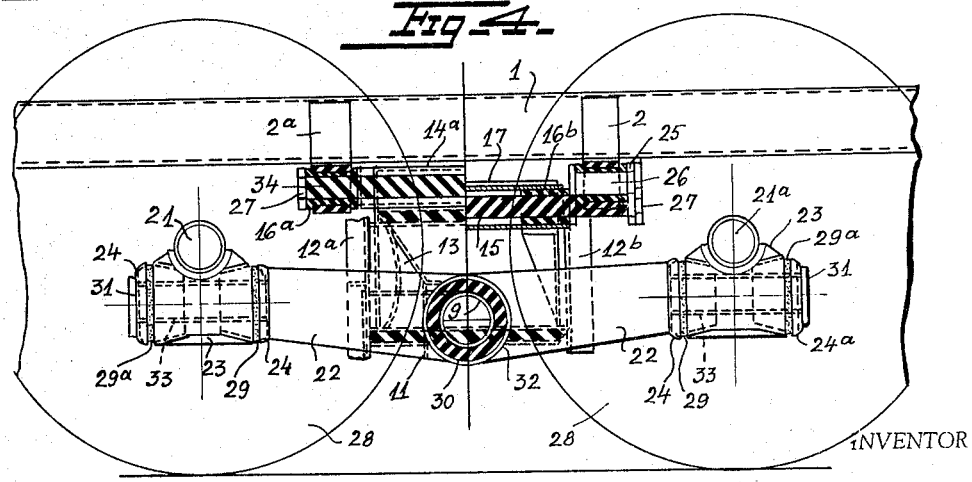
FIG. 5 is a fragmentary vertical sectional and side elevational view showing, to the left of the vertical centerline, the top of the inside crossed lever at the frame bracket, and showing to the right of the vertical centerline of this view, the shackle connection of the divided lever to the frame, and the suspension beam connections to a pair of crossed axles of a vehicle bogie.

Referring now particularly to FIGS. 3, 4, 5, the longitudinally-extending, transversely-disposed frame rail 1a, is supported by the suspension at the frame brackets 2a, which encompass the resilient spaced bushings 16a, located on opposite ends of the bushing hinge pin 34 which is secured to and extends longitudinally beyond the side of the upper end 14a of a crossed lever 13.

The matching frame rail 1, is supported by frame brackets 2, surrounding resilient bushings 16a mounted on shackle pins 26 which are carried on shackle links 25a secured to bushing hinge shaft 15a which is journalled in resilient bushings 16b pressed into the tubular upper end 17 of divided lever 12. The lower ends 12a, 12b of divided lever 12 are joined below their point of interference with the inside lever 13, by the connecting tube 11 to which the beam trunnion 9a is welded. The inside crossed lever 13 is provided at its lower end with an integral beam trunnion 9. Both trunnion 9, 9a are fitted with opposing tapered resilient bushings 30, 30 and respectively adjustably restrained within the centrally disposed suspension beam sockets 32, 32a by respective cupped washers 24, 24a and end bolts 31a, 31a, which are threaded into the tapped ends of trunnions 9, 9a. The suspension beams 22, 22a from their centrally-disposed suspension beam sockets 32, 32a extend fore and aft, terminating in integral tubular trunnions 33, 33 tapped to receive end bolts 31, 31 and provided with opposing cupped washers 24, 24a, between which opposing tapered resilient bushings 29, 29a are adjustably confined within axle brackets 23, 23 which are secured to axles 21, 21a by welding or other conventional means.

Brake and drive torque reactions on axles 21, 21a are transferred to beams 22, 22a through controlled angular deflection of the opposed tapered resilient bushings 29, 29a on beam end trunnions 33, while vertical movement of each end of said axles 21, 21a is accompanied by torsional movement in said bushings 29, 29a on said trunnions 33, together with resultant torsional and angular movement in tapered bushings 30, 30a on crossed lever trunnions 9, 9a in sockets 32, 32a midlength of beams 22, 22a.

The end trunnions 33 on beams 22, 22a are disposed upwardly and outwardly in relation to the center of suspension beam sockets 32, 32a located midlength of said beams 22, 22a to provide a shackle means permitting trunnions 9, 9a on the lower ends of crossed levers 13, 12 to swing in their natural arcuate path as they move about their common center of the torsionally stressed elastomer bushing 18.

The term "shackle means" as used herein is constituted by the suspension beams 22, 22a wherein the trunnions 9, 9a on the lower ends of crossed levers 13, 12 connect to the longitudinal center of suspension beams 22, 22a in sockets 32, 32a which are below the centers of beam end trunnions 33, 33a whereby beams 22, 22a may oscillate about the center of end trunnions 33, 33a as trunnions 9, 9a move transversely about the common center of the torsionally stressed bushing 18 in an arcuate path proscribed by the radii of the transverse distance from the center of bushing 18 to the centers of beam sockets 32, 32a to beam end trunnions 33, 33a. Beams 22, 22a have their upper bearings or hinge points 33, 33a longitudinally distant beyond bearing or hinge points 32, 32a. Further, sockets 32, 32a for trunnions 9, 9a are offset below and transversely inwardly of beam end trunnions 33, 33a to afford controlled transverse movement of axles 21, 21a relative to frames 1, 1a since such movement is otherwise restricted by the non-shackled frame bracket 2a.

Longitudinal shear forces between suspension wheels 28, 28 and frames 1, 1a, created by brake, and/or drive torque are transferred from axles 21, 21a to beams 22, 22a then to crossed levers 12, 13 which are hingedly connected at torsionally stressed bushing 18, and to respective frame bracket bushings 16, 16a, which are spaced sufficiently apart longitudinally to minimize any longitudinal hinge tendency between wheels and frame.

It is understood that suspension beams 22, 22a may be optionally superimposed over axles 21, 21a in axle brackets 23, 23, or hung from the axles on conventional cross pins, in which later case brake and drive torque reactions may optionally be taken through conventional torque rods connected above axle center, thence to a frame cross member; without prejudice to the novelty of this invention.

The resistance of steel springs to static and to dynamic forces is practically equal, but when elastomer bushings are used for vehicle suspensions, the problem is worsened, as the static resistance of elastomer bushings usable in torsional shear varies from but eighty percent to sixty-five percent of their dynamic resistance, depending on the elastomer bushing compound suitable for a given spring characteristic. Inversely, their static deflection varies from 1.2 to 1.4 times their dynamic deflection.

This low static characteristic of elastomer bushings has restricted their application in vehicles operating at commercial transport speeds, with conventional high load centers, to provide a soft ride. Hence, the novelty of this invention which affords a suspension infinitely more sensitive to cushioning of vertical dynamic shocks while providing complete freedom from the inadequate static resistance of an elastomer which otherwise would permit an impractical transverse roll.

There is no novelty in the use of elastomer bushings stressed in torsional shear, and a century has passed since the first U.S. patent on spring equalizers, but invention here lies in the sole combination which enables an elastomer bushing to effect the equivalent of reversing its natural ratio of static to dynamic resistance for a vehicle suspension.

Referring now to the modification of the invention shown in FIGS. 6 to 9, inclusive, herein a modified form of the suspension for mounting pairs of wheels 28', 28", in tandem, is shown. A torsionally stressed elastomer bushing 18' is shown between an outer shaft 19' and an inner shaft 20' similar to FIG. 1. The matching frame rail 1a' on each side of the vehicle is supported by a frame bracket 2' which has a rectangular channel-shaped body 40 with a depending solid extension 41, with flaring bottom end corners 42, 42. The corners are perforated. The body 40 of the bracket is secured to the frame rails by rivets 43.

The suspension beams 22', 22" have elongated tapered bodies terminating at the wide end thereof in extensions 45, 45 offset upwardly from the planes of the bodies, which extensions terminate in pointed perforated ends 46. Each beam is formed with a socketed opening 32" at its wide end whereby the beams are hingedly connected to the torsionally stressed bushing 18'. The narrow ends of the beams 22', 22" are connected to the axles 21', 21" of the wheels 28' and 28", respectively, by means of axle brackets 23', 23" respectively, welded to the axles. The beam extensions 45, 45 are disposed upwardly and outwardly in relation to the center of suspension beam sockets 32' and 32" located at the wide end of said beams 22' and 22", respectively, as viewed in FIG. 7 to provide a shackle means permitting the narrow ends of the beams to swing in their natural arcuate path as they move about their common center of the torsionally stressed elastomer bushing 18'.

In accordance with the invention shackles 54 and 52 are connected between the brackets 2' and the pointed ends 46, 46 of the extension 45, 45. Each shackle consists of a rectangular body with rounded ends 56, 56 formed with holes 58, 58. Bushings 60, 60 are mounted in the holes with pivot pins 62 and 64 supported in the top and bottom bushings, respectively. Pivot pins 62, 62 are inserted through the holes in the extension 46 of the beams 22' and 22", respectively, and the other pins 64, 64 are inserted through the performed corners 42 of the brackets 2'.

The perforated ends 46 of the extensions 45, 45 of both beams are around the top pins 62, 62 of the shackles, and the perforated corners 42, 42 of the brackets 2' are around the bottom pins 64, 64 of the shackles so that the shackles are interposed between the beams and the brackets.

It will be noted that the modified form of invention shown in FIGS. 6 to 9, inclusive, differs from the invention of U.S. Patents 2,951,710, 3,013,808 and 3,171,668 in that suspension is effected without a supporting shaft from the vehicle structure for the elastomer bushing. Such novelty applies to single as well as tandem application of this bushing restrained cross beam suspension.

It will also be noted from FIG. 7 that a 15° rise of the wheel on the right (R) axle is possible whereat the shackle interconnecting the upper end of the cross beam with the frame bracket 1a' as shown in FIG. 6 at the same radius as line R in FIG. 7 prescribes an almost identical path to radius R of the beam, thus said wheel may be displaced 15° (or 6¾" on a 20" axle beam) by a dynamic load with practically no rise of the vehicle frame at the shackles, as the elastomer bushing will deflect torsionally to enable said dynamic deflection. However, such would not be true with a static load, but static forces are far less critical than dynamic in vehicle side control.

This same assembly, when installed in a vehicle at 90° to that shown and applied to a single axle, will likewise afford considerable relative parallelism between axle axis and frame under static loads, while providing the same inertial stability (transversely) under dynamic loading forces.

Inversely, as the relation of beam length above beam center, to shackle length increases, as shown in FIGS. 1, and 3, static force control increases and dynamic force freedom diminishes.

Overall width laws, vehicle frame width and limited transverse space from frame to inside dual tires of commercial transport vehicles, confines the transverse spacing of springs, and, in turn, limits the ability of a spring to resist the combination of vertical dynamic and transverse static forces, imposed by high vehicle speed, with a highly centered load, to be cushioned vertically at a low natural frequency of spring vibration, i.e. a soft ride, which requires a high vertical deflection under dynamic shocks. The transverse static force is centered at the load mass which may be superimposed five to six feet above suspension springs, and results from a change in the directional path of the moving vehicle acting on the inertia of the superimposed load mass to depress the suspension spring outwardly of the center of the new path of travel while unloading the spring upwardly of the new path of travel. Thus, the transverse static load is added to the vertical dynamic load which the spring carries on a straightaway run, so vertical deflection from dynamic loads or soft ride, must be sacrificed to prevent dangerous transverse roll and loss of operative control.

While various changes may be made in the detailed construction it may be understood that such changes shall be within the spirit and scope of the present invention as defined in the appended claims.

What is claimed is:
1. The combination of a vehicle frame structure, a crossed lever having a shaft, an opposing cross lever having a hollow shaft surrounding said shaft of the first lever, an elastomer bushing stressed in torsional shear bondedly interconnecting said shaft and said hollow shaft, connection means for connecting the upper ends of said crossed levers to the respective opposite sides of said frame, the lower ends of said crossed levers provided with wheel connection means whereby torsional shear strains in said elastomer bushing provides uniform vertical deflections between said frame and said wheel connection means, said frame connection means comprising a hinge connection for one lever and a shackle for the opposing lever.

2. The combination as defined in claim 1, and said wheel connection means comprising a wheel trunnion extending transversely from the lower end of each of said crossed levers.

3. The combination as defined in claim 1, and said wheel connection means comprising a trunnion extending transversely from the lower end of each said crossed lever, a centrally pivoted longitudinally extending beam mounted on each trunnion, and transversely extending longitudinally spaced axles supporting the ends of said beams.

4. The combination as defined in claim 3, and said beams constituting a shackle means between said cross levers and said axles.

5. In a vehicle frame structure having opposite sides, a load-bearing wheel spindle at each opposite side of the frame structure, crossed levers located in the same vertically disposed traverse plane having concentrically-disposed floating hubs, a tubular elastomer stressed in torsional shear and bondedly interconnecting said hubs at the pivotal axis of said levers, connection means between an upwardly extending end of each lever and the respective opposite sides of said frame, and connection means between an oppositely extending end of each lever and said wheel spindles, one of said connection means between the levers and frame comprising a shackle.

References Cited by the Examiner
UNITED STATES PATENTS

| 1,392,974 | 10/1921 | Smith | 267—20 |
| 2,377,809 | 6/1945 | Reck | 105—182 |
| 2,453,117 | 11/1948 | Buckendale | 267—57.1 |
| 2,951,710 | 9/1960 | Willetts | 280—104.5 |
| 3,013,808 | 12/1961 | Willetts | 280—104.5 |

BENJAMIN HERSH, Primary Examiner.

LEO FRIAGLIA, Examiner.

P. GOODMAN, Assistant Examiner.